United States Patent
Dotson

[19]

[11] Patent Number: 6,149,170
[45] Date of Patent: Nov. 21, 2000

[54] BIKE-LIKE REHABILITATION DEVICE

[75] Inventor: David A. Dotson, 1703 S. Lapeer Rd., Lapeer, Mich. 48446

[73] Assignee: David A. Dotson, Lapeer, Mich.

[21] Appl. No.: 09/079,208

[22] Filed: May 14, 1998

[51] Int. Cl.$^7$ ........................................... B62M 1/00
[52] U.S. Cl. ........................ 280/87.021; 280/87.01; 280/267; 280/282; 403/321; 403/326; 403/353
[58] Field of Search ........................ 280/267, 282, 280/87.01, 87.021; 403/353, 321, 326

[56] References Cited

U.S. PATENT DOCUMENTS

| | | | |
|---|---|---|---|
| 653,397 | 7/1900 | Pettijohn | 403/353 |
| 1,535,167 | 4/1925 | Lovell | 208/87.021 |
| 2,712,151 | 7/1955 | Becht | 403/321 |
| 2,832,943 | 4/1958 | Cutler | 403/326 |
| 3,108,678 | 10/1963 | McCabe . | |
| 3,730,108 | 5/1973 | Stroh | 108/108 |
| 3,992,024 | 11/1976 | Workman | 280/87.041 |
| 4,065,145 | 12/1977 | Chambers | 280/87.021 |
| 4,084,736 | 4/1978 | Jacobs, Jr. | 414/462 |
| 4,917,396 | 4/1990 | Meneses et al. | 280/267 |
| 5,120,074 | 6/1992 | Herman et al. | 280/220 |
| 5,158,313 | 10/1992 | Becker | 97/5 |
| 5,167,597 | 12/1992 | David | 482/68 |
| 5,588,771 | 12/1996 | Scott et al. | 403/353 |
| 5,702,326 | 12/1997 | Renteria | 482/68 |

*Primary Examiner*—Brian L. Johnson
*Assistant Examiner*—Deanna Draper
*Attorney, Agent, or Firm*—Harness, Dickey & Pierce, P.L.C.

[57] ABSTRACT

A rehabilitation device which includes a frame supported on a plurality of wheels. The frame includes a longitudinal member supported on a rear wheel and transverse member supported on a pair of front wheels. The longitudinal member includes a descending section which is located substantially close to the ground to facilitate getting on and off the rehabilitation device, without having to substantially raise a leg. The frame assembly may be connected using the interconnect fitting. The interconnect fitting enables quick assembly of assembly and disassembly of the device so that the device may be transported as two lightweight, compact pieces.

15 Claims, 3 Drawing Sheets

BIKE-LIKE REHABILITATION DEVICE

BACKGROUND OF THE INVENTION

1. Field of the Invention

The present invention relates to a rehabilitation device for assisting the physically challenged and, more particularly, a tricycle-like device for enabling a physically challenged individual to partially sit on the device while using their legs to propel the device while in the partially-seated position.

2. Discussion

Providing a device which enables a physically challenged individual to efficiently and conveniently rehabilitate and move around has always been a challenge for the assistive devices industry. For example, a physically challenged individual may encounter difficulty walking or difficulty supporting their own body weight due to leg, back, joint, or other inflections. For such individuals, transportation in situations where the individual who is not physically challenged would normally walk is often difficult. Ideally, the physically challenged individual would be able to support a substantial portion of their body weight while seated in the resting position while their legs provide motion.

Available alternatives for meeting the demands for the physically challenged individual include a wheel chair or a motorized vehicle. Although both of these alternatives do enable the physically challenged individual to transport themselves, these devices are typically heavy and bulky. Further, because physically challenged individuals often must ride in a vehicle to a destination, such as a mall or grocery store, then rely on the assistive device to move within the mall or grocery store to shop. Because wheel chairs and motorized vehicles are typically bulky and relatively heavy, these devices do not led themselves to convenient placement into and removal from a vehicle. Thus, there is a need for an assistive device for convenient transportation of a physically challenged individual which is relatively compact and light-weight in order to facilitate its usage.

SUMMARY OF THE INVENTION

This invention relates to an apparatus for assisting the physically challenged, including a rear wheel and a plurality of front wheels. The wheels support a frame which includes a generally longitudinal member supported by the rear wheel and has a section in close proximity to ground level to facilitate mounting the apparatus. The frame also includes a generally transverse member supported by the front wheels. A fitting has a first portion connected to the generally longitudinal member and a second portion connected to the generally transverse member, thereby facilitating assembly and disassembly of the frame. A steering mechanism enables coordinated movement of the front wheels to control the direction of the apparatus.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
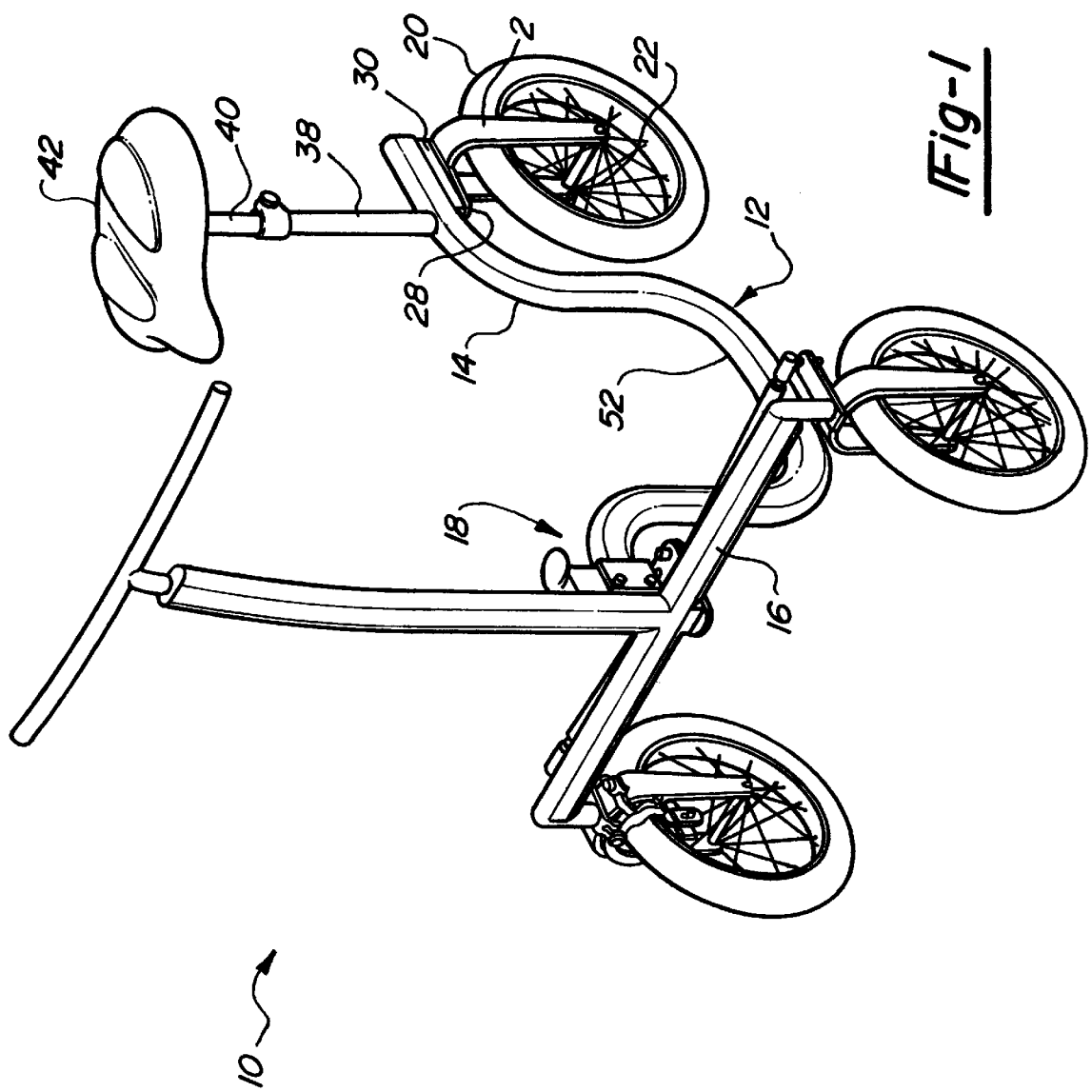
FIG. 1 is a perspective view of the bike-like rehabilitation device arranged in accordance to the principals of the present invention.
Figure 2:
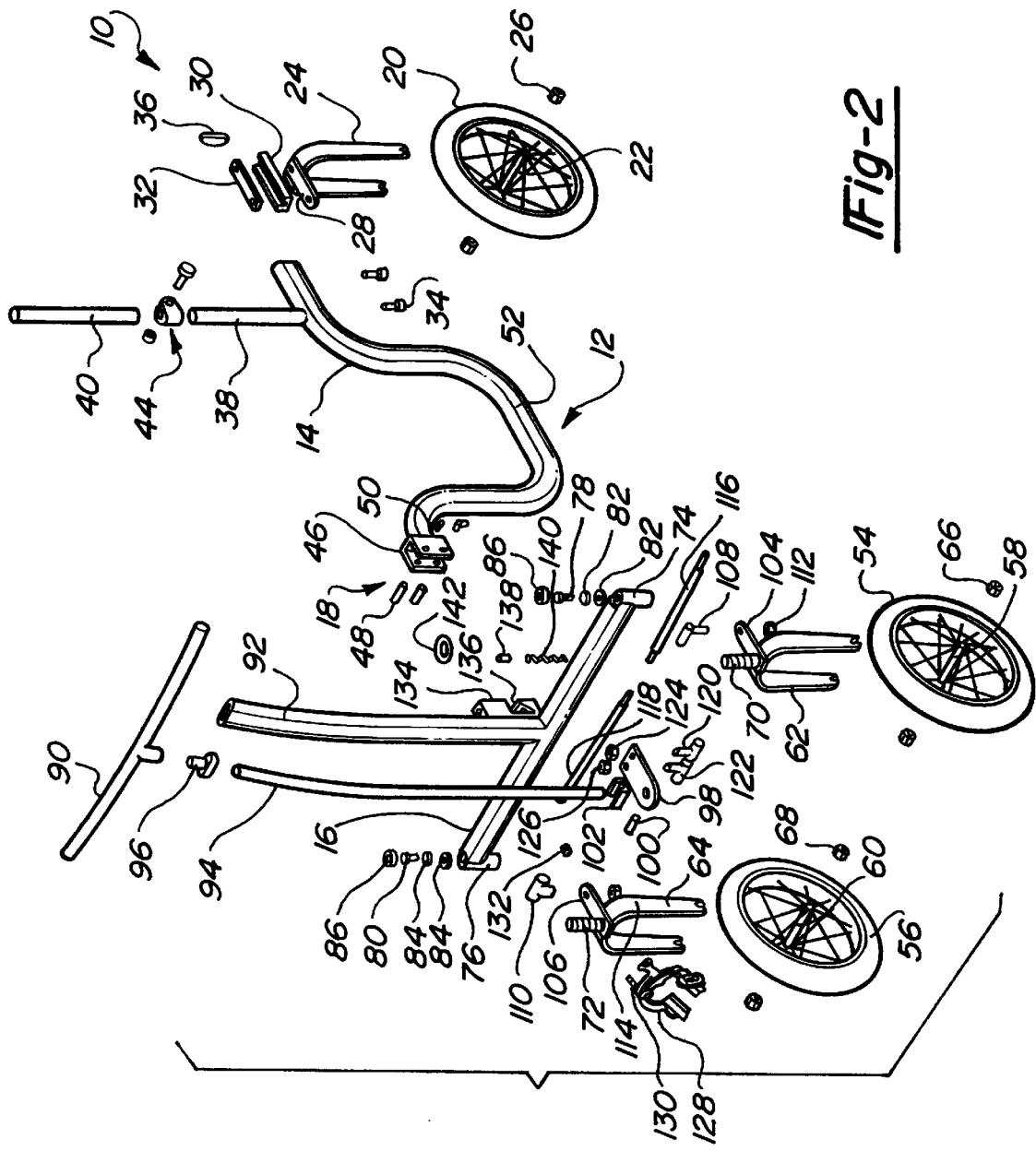
FIG. 2 is an exploded view of the bike-like rehabilitation device of FIG. 1.

The rehabilitation device 10 will be described generally with respect to FIGS. 1 and 2. Rehabilitation device 10 includes a frame assembly 12 which comprises a longitudinal member 14 and a transverse member 16. The longitudinal member 14 and transverse member 16 are joined via an interconnect fitting 18, as will be described herein.

Longitudinal member 14 is supported upon a rear wheel 20. Rear wheel 20 includes an axle 22 having outboard, threaded ends. A fork 24 is attached to axle 22 using nuts 26 which threadbly engage the outboard ends of axle 22. Fork 24 includes a bracket 28 for attachment for longitudinal member 14. A spacer 30 has a generally flat underside for interfacing with bracket 28. And unshaped upper side which is shaped similarly to the underside of longitudinal member 14 so that spacer 30 provides a generally ridged interconnection between bracket 28 and longitudinal member 14. A backing plate 32 is inserted within longitudinal member 14 and a pair of bolts 34 threadbly engage backing plate 32 in order to interconnect the fork 24 to longitudinal member 14. An end cap 36 is inserted into the rear of longitudinal member 14 to provide a decorative finish to the interconnection between 24 and longitudinal member 14.

Longitudinal member 14 also includes a seat sleeve 38 vertically extending from a top side of longitudinal member 14. Seat sleeve 38 receives a seat post 40 which telescopically moves within seat sleeve 38 to adjust the height of a seat 42. A clamp assembly 44 around seat sleeve 38 tightens seat sleeve 38 around seat post 40 to lock seat post 40 in place. Longitudinal member 14 also includes a channel 46 which comprises an inner portion of connect fitting 18. Channel 46 receives a pair of transverse pins 48 which are held in place at one end by a ring (not shown) and a threaded fastener 50 at another end.

A particularly inventive feature of the present invention is that longitudinal member 14 includes a section 52 which is arranged in order to facilitate mounting rehabilitation device 10. As can be seen, particularly in FIG. 1, section 52 is generally very close to ground level so that the user need not strain in order to lift a leg high over longitudinal section 14, as is the case with may other devices.

Transverse member 16 of frame assembly 12 is supported upon a pair of front wheels 54, 56, with each having a pair of axles 58, 60. Axles 58 and 60 have outboard, threaded ends. Each axle 58, 60 engages a fork 62, 64 which is fastened to wheels 54, 56 nuts 66, 68 respectively. Forks 62, 64 include threaded posts 70, 72 which are inserted through bores 74, 76, respectively, on the outboard ends of transverse member 16. Bolts 78, 80 engage internal threads of the respective threaded posts 70, 72 through washer sets 82, 84. End caps 86, 88 are placed on top of respective bolts 78, 80 to provide a decorative finish thereto. Posts 70, 72 pivot within respective bores 74, 76 to enable steering rehabilitation device 10 using front wheels 54, 56.

Steering is accomplished through a steering bar or yoke 90 which pivotally attaches to a top end of gooseneck 92. A steering rod 94 connects to steering bar 90 through fitting 96. Steering rod 94 may be formed of a material such as a metal, nylon, or plastic. Steering rod 94 may be placed external to gooseneck 92, but is preferably placed through gooseneck 92 so that steering rod 94 is not visible. Gooseneck 92 is curved in a rearward direction for convenience of the user. Preferably a flexible nylon rod is needed for steering internally through gooseneck 92. At its lower end, steering rod 94 connects to a pivoting steering bracket 98 and is held in place using a spring pin 100. Prior to ridged connection to steering bracket 98, steering rod 94 passes through spacer 102 which rigidly attaches to the underside of transverse member 16. Rotation of steering bracket 98 causes a corresponding rotation of forks 62, 64 through steering linkages, as will be described herein. Each fork 70, 72 includes a respective steering lever 104, 106, each of which connects to a respective fitting 108, 110 using threaded fasteners 112, 114. Fittings 108, 110 engage connecting rods 116, 118, respectively. Connecting rods 116, 118 connect to steering bracket 98 using inboard fittings 120, 122, respectively, and are fastened using threaded fasteners 124, 126. Thus, rotation of steering bar 90 causes corresponding rotation of wheels 54, 56 through steering rod 94, and respective connecting rods 116, 118. The rehabilitation device 10 also includes a brake 128. Brake 128 includes a threaded mounting stud 130 to enable attachment to fork 64 using a threaded fastener 132.

With reference to frame assembly 12, longitudinal member 14 and transverse member 16 are generally formed of generally oval-shaped tubing, such as extruded aluminum tubing. In one embodiment, the extruded aluminum tubing has a 0.125 inch wall thickness and must tolerate a minimum four inch bend radius. Such a configuration enables bending to accommodate lower section 52 of longitudinal member 14.

Figure 3:
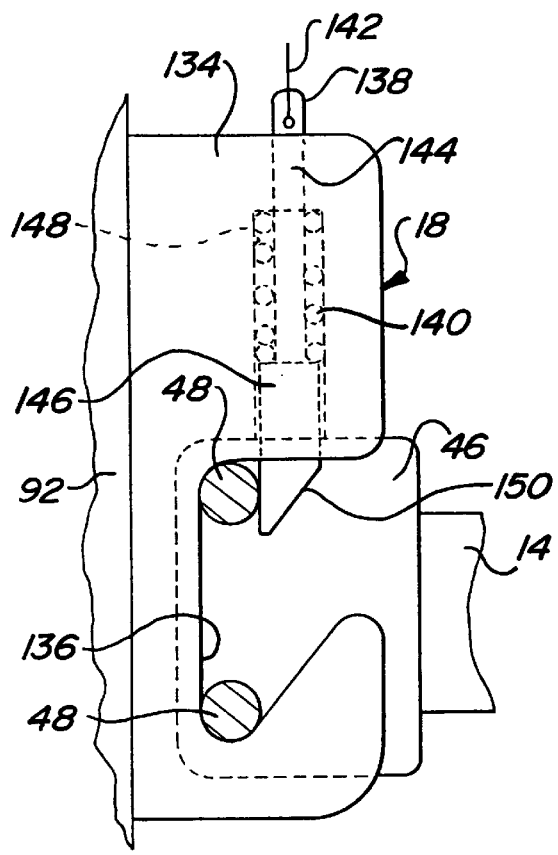
FIG. 3 is a side view that interconnect fitting showing engagement between the two frame portions.
Figure 4:
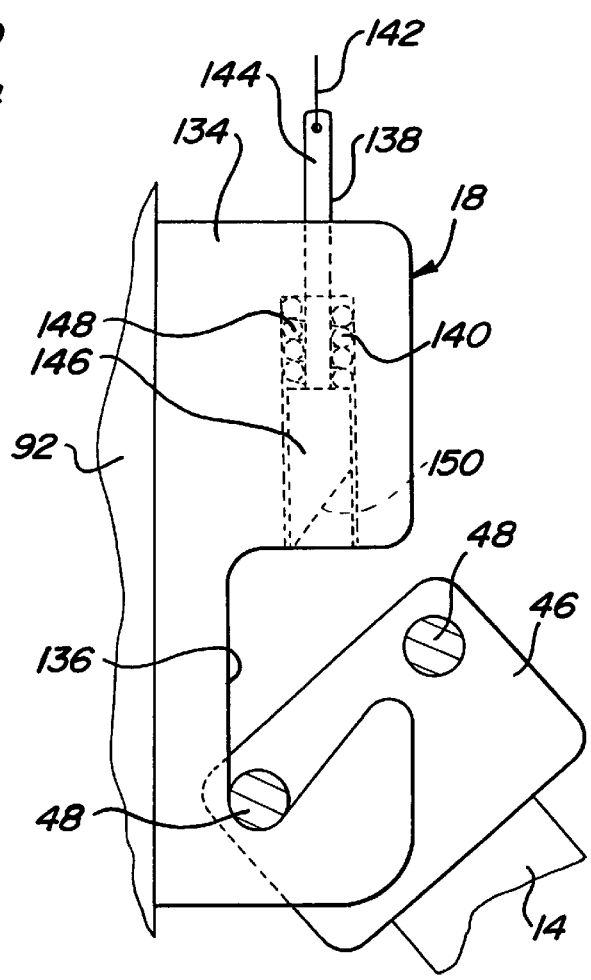
FIG. 4 is a side view of the interconnect fitting showing operation of the interconnect fitting to engage the frame portions.

Gooseneck 92 also includes a portion of interconnect assembly 18. In particular, gooseneck 92 supports a block 134 having formed therein a notch 136. FIGS. 3 and 4 depict a side view of interconnect fitting 18. As described above, interconnect fitting 18 comprises a block 134 attached to gooseneck 92. Block 134 includes a notch 136 which is formed to accommodate pins 48 inserted into channel 46, which is attached to longitudinal member 14. With respect to FIG. 3, interconnect fitting 18 is shown having longitudinal member 14 and transverse member 16 positively connected using interconnect fitting 18. Interconnect fitting 18 includes a spring pin 138 having a pin 144 and a stopper 146 which reciprocates within a bore 148. Spring 140 exerts a downward force on stopper 146 to lock pins 148 in notch 136. Retainer ring 142 limits downward movement of spring pin 138. Notch 136 is formed to accommodate pins 48 so that pins 48 cannot slip out of notch 136 once stopper 146 moves downwardly and adjacent to upper pin 48.

FIG. 4 depicts longitudinal member 14 and transverse member 16 shown partially disassembled. In order to disengage longitudinal transverse members 14 and 16, retainer ring 142 is pulled upward to move spring pin 138 upward, thereby removing the interference condition between stopper 146 and pin 48. Once the interference condition is removed, longitudinal member 14 and transverse member 16 are pivoted relative to each other about lower pin 48, thereby enabling upper pin 48 to move out from notch 136. Lower pin 48 may then be simply slipped out of notch 136.

One skilled in the art will readily recognize that stopper 146 includes an angled surface 150 so that during assembly of longitudinal member 14 and transverse member 16, upper pin 48 presses against angled surface 150 to cause spring pin 138 to move upward and enable upper pin 48 fully into notch 136. Once upper pin 48 moves beyond the lower tip of stopper 146, spring 140 forces spring pin 138 downward to interconnect longitudinal member 14 and transverse member 16.

In operation, the rehabilitation device 10 is preferably adjusted so that the user is seated upon seat 42 with only a slight bend in the knees to enable the legs to propel rehabilitation device 10. Section 52 is preferably low to the ground to facilitate mounting and dismounting rehabilitation device 10. Further, rehabilitation device 10 includes a frame assembly 12 having a longitudinal member 14 and a transverse member 16 connected using an interconnect fitting 18 to facilitate assembly and disassembly of the rehabilitation device 10. Rehabilitation device 10 may be disassembled so that the device can be moved in two compact, lightweight pieces and stored generally flat to facilitate transportation in a vehicle.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. An apparatus for assisting the physically challenged, comprising:
    a rear wheel;
    a plurality of front wheels;
    a frame supported by the front and rear wheels, the frame comprising a generally longitudinal member supported by the rear wheel and connecting to a generally transverse member supported by the front wheels, wherein the longitudinal member includes an upper, horizontal section and a lower, horizontal section between the rear wheel and the transverse member, and the lower section is in close proximity to ground level to facilitate mounting the apparatus;
    a seat attached to said frame for supporting a user in a substantially partially seated standing position;
    a spring interconnect fitting having a first portion connected to the generally longitudinal member and a second portion connected to the generally transverse member, the spring interconnect fitting facilitating assembly and disassembly of the frame; and
    a steering mechanism for enabling coordinated movement of the front wheels to control the direction of the apparatus.

2. The apparatus of claim 1 wherein the steering mechanism further comprises:
    a generally vertical member extending from the transverse member;
    a rotatable steering bar disposed at an upper end of the vertical member;
    a pivot mechanism disposed near the transverse member, the pivot mechanism being connected to each of the plurality of front wheels by a plurality of linkages for enabling rotational movement of each of the front wheels in accordance with rotation of the steering bar; and
    a connecting rod interconnecting the steering bar and the pivot mechanism.

3. The apparatus of claim 2 wherein each of the plurality of wheels is mounted to a fork which is operativley connected to the transverse member.

4. The apparatus of claim 1 further comprising a seat attached to a seat post supported on the longitudinal member.

5. The apparatus of claim 4 wherein the seat post is telescopically adjustable to vary a height of the seat.

6. The apparatus of claim 1 wherein one of the first and second portion of the interconnect fitting comprises a block having formed therein a notch for pivotally connecting the block to the other of the first and second portion of the interconnect fit, and the other of the first and second portion of the interconnect fitting comprises a channel for receiving the block, the channel having a pair of transverse pins for insertion into the notch.

7. The apparatus of claim 6 wherein the block includes a spring pin for maintaining a connection between the first and second portions of the interconnect fitting, the spring pin providing a stop for one of the transverse pins to prevent pivotal motion between the longitudinal and transverse members. wherein one of the first and second portion of the interconnect fitting comprises a block having formed therein a notch for connecting to the other of the first and second portion of the interconnect member, and the other of the first and second portion of the interconnect member comprises a channel for receiving the block, the channel having a pair of transverse pins for insertion into the notch; and a steering mechanism for enabling coordinated movement of the front wheels to control a direction of travel.

8. The apparatus of claim 1 further comprising a brake disposed on one of the wheels.

9. An apparatus for assisting the physically challenged, comprising:

a rear wheel;

a pair of front wheels;

a frame supported by the front and rear wheels, the frame comprising a generally longitudinal member supported by the rear wheel and connected to a generally transverse member supported by the front wheels, wherein the longitudinal member includes a lower, horizontal section between a pair of upper, horizontal sections between the rear wheel and the transverse member, the lower section being in close proximity to ground level to facilitate mounting the apparatus;

a seat attached to the frame for supporting the user in a substantially partially seated standing position;

a spring interconnect fitting for connecting the longitudinal and transverse members, wherein pivotal motion between the longitudinal and transverse members effects connection and disconnection of the longitudinal and transverse members, wherein the interconnect fitting further comprises a first portion connected to the longitudinal member and a second portion connected to the transverse member and wherein one of the first and second portion of the interconnect fitting comprises a block having formed therein a notch for connecting to the other of the first and second portion of the interconnect member, and the other of the first and second portion of the interconnect member comprises a channel for receiving the block, the channel having a pair of transverse pins for insertion into the notch; and a steering mechanism for enabling coordinated movement of the front wheels to control a direction of travel.

10. The apparatus of claim 9 where in the block includes a spring pin for maintaining a connection between the first and second portions of the interconnect fitting, the spring pin providing a stop for one of the transverse pins to prevent pivotal motion between the longitudinal and transverse members.

11. The apparatus of claim 9 wherein the steering mechanism further comprises:

a generally vertical member extending from the transverse member;

a rotatable steering bar disposed at an upper end of the vertical member;

a pivot mechanism disposed near the transverse member, the pivot mechanism being connected to each of the plurality of front wheels by a plurality of linkages for enabling rotational movement of each of the front wheels in accordance with rotation of the steering bar; and a connecting rod interconnecting the steering bar and the pivot mechanism.

12. The apparatus of claim 11 further comprising a seat attached to a seat post supported on the longitudinal member.

13. The apparatus of claim 12 wherein the seat post is telescopically adjustable to vary a height of the seat.

14. The apparatus of claim 13 wherein each of the plurality of wheels is mounted to a fork which is operatively connected to the transverse member.

15. The apparatus of claim 14 further comprising a brake disposed on one of the wheels.

* * * * *